(12) United States Patent
Hussain et al.

(10) Patent No.: US 9,191,114 B2
(45) Date of Patent: Nov. 17, 2015

(54) QUALITY OF SERVICE APPLICATION FOR DIFFERENT DATA FLOW TYPES

(71) Applicants: Iftekhar Hussain, Santa Clara, CA (US); Satyajeet Singh Ahuja, Cupertino, CA (US); Jan Bialkowski, San Jose, CA (US); Marco E. Sosa, San Jose, CA (US)

(72) Inventors: Iftekhar Hussain, Santa Clara, CA (US); Satyajeet Singh Ahuja, Cupertino, CA (US); Jan Bialkowski, San Jose, CA (US); Marco E. Sosa, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 79 days.

(21) Appl. No.: 13/852,347

(22) Filed: Mar. 28, 2013

(65) Prior Publication Data

US 2014/0169788 A1  Jun. 19, 2014

(51) Int. Cl.
*H04B 10/00* (2013.01)
*H04B 10/27* (2013.01)
*H04L 12/00* (2006.01)

(52) U.S. Cl.
CPC ............... *H04B 10/27* (2013.01); *H04L 12/00* (2013.01)

(58) Field of Classification Search
USPC .................................... 398/43, 58, 63, 71–72
See application file for complete search history.

(56) References Cited

U.S. PATENT DOCUMENTS

| | | | | | |
|---|---|---|---|---|---|
| 6,154,776 | A | * | 11/2000 | Martin | 709/226 |
| 7,191,229 | B2 | * | 3/2007 | Edmondson | 709/224 |
| 7,197,244 | B2 | * | 3/2007 | Thomas et al. | 398/72 |
| 7,330,654 | B2 | * | 2/2008 | Song et al. | 398/71 |
| 7,483,632 | B2 | * | 1/2009 | Sung et al. | 398/63 |
| 7,653,084 | B2 | * | 1/2010 | Shin et al. | 370/468 |
| 7,733,780 | B2 | * | 6/2010 | Kim et al. | 370/235 |
| 8,036,530 | B2 | * | 10/2011 | Arnold et al. | 398/58 |
| 8,630,540 | B1 | * | 1/2014 | Arnold et al. | 398/58 |
| 2005/0074238 | A1 | * | 4/2005 | Sung et al. | 398/58 |
| 2013/0108269 | A1 | * | 5/2013 | Kim et al. | 398/58 |
| 2014/0169788 | A1 | * | 6/2014 | Hussain et al. | 398/43 |

OTHER PUBLICATIONS

J. Wroclawski, "The Use of RSVP with IETF Integrated Services", Network Working Group, Request for Comments: 2210, Sep. 1997, http://www.ietf.org/rfc/rfc2210.txt, 31 pages.
S. Blake et al., "An Architecture for Differentiated Services", Network Working Group, Request for Comments: 2475, Dec. 1998, http://www.ietf.org/rfc/rfc2475.txt, 34 pages.

* cited by examiner

*Primary Examiner* — Agustin Bello
(74) *Attorney, Agent, or Firm* — Harrity & Harrity LLP; David L. Soltz (57) ABSTRACT

A network device is configured to store parameters identifying a respective quality of service (QoS) to apply to corresponding different types of data flows; initiate establishment of a network channel between a source device and a destination device through an optical network; receive first and second data flows destined for the destination device, where the first data flow and the second data flow may have first and second data flow types; identify a first QoS and a different second QoS to apply to the first and second data flows based on the first and second data flow types and based on the parameters; apply the first QoS to the first data flow and the second QoS to the second data flow to form processed first and second data flows; and transmit, via the network channel, the processed first and second data flows towards the destination device.

17 Claims, 8 Drawing Sheets

| Channel Information 410 |||||
|---|---|---|---|---|
| Channel type: E-LSP <br> Scheduling Algorithm: Weighted Fair |||||
| Data flow type 420 | QoS Parameters 430 | Excess resource allocation 440 | Weight Value 450 | Priority Value 460 |
| Type 1 | PIR 1 <br> CIR 1 <br> PBS 1 <br> CBS 1 | Allocation percentage 1 | Value 1 | Value 1.1 |
| Type 2 | PIR 2 <br> CIR 2 <br> PBS 2 <br> CBS 2 | Allocation percentage 2 | Value 2 | Value 2.1 |
| ⋮ |||||
| Type Z | PIR Z <br> CIR Z <br> PBS Z <br> CBS Z | Allocation percentage Z | Value Z | Value Z.1 |
| Aggregate | PIR Aggregate <br> CIR Aggregate <br> PBS Aggregate <br> CBS Aggregate | 100% | N/A | N/A |

QUALITY OF SERVICE APPLICATION FOR DIFFERENT DATA FLOW TYPES

RELATED APPLICATION

This application claims priority under 35 U.S.C. §119 to U.S. Provisional Patent Application No. 61/737,330, filed Dec. 14, 2012, the disclosure of which is incorporated herein by reference in its entirety.

BACKGROUND

Network devices, such as routers, switches, gateways, etc., are sometimes used to transmit a data flow to and/or from a client device. Network devices sometimes include information regarding a Quality of Service (QoS) that identifies how the data flow is to be treated during transmission (e.g., such that the data flow receives a desired level of network resources and/or a desired service). Different types of data flows may be in need of different QoS treatments. Providing information that identifies different QoS treatments for different types of data flows to multiple network devices can be cumbersome and difficult to manage.

SUMMARY

According to one example implementation, a method may include storing, by a network device, multiple parameters identifying a respective quality of service (QoS) to apply to a corresponding multiple different types of data flows; initiating, by the network device, establishment of a network channel between a source device and a destination device through an optical network; and receiving, by the network device, first and second data flows, of multiple data flows, from the source device and destined for the destination device. The first data flow may have a first data flow type, of the multiple different types of data flows, and the second data flow may have a second data flow type of the multiple different types of data flows. The first data flow type may be different than the second data flow type. The method may include identifying, by the network device, a first QoS to apply to the first data flow based on the first data flow type and based on the multiple parameters; and identifying, by network device, a second QoS to apply to the second data flow based on the second data flow type and based on the multiple parameter. The second QoS may be different than the first QoS. The method may include applying, by network device, the first QoS to the first data flow to form a processed first data flow; applying, by network device, the second QoS to the second data flow to form a processed second data flow; and transmitting, by the network device and via the network channel, the processed first data flow and the processed second data flow towards the destination device.

According to another example implementation, one or more network devices may store multiple parameters identifying a respective QoS to apply to a corresponding multiple different types of data flows; facilitate establishment of a network channel between a source device and a destination device through an optical network; and receive first and second data flows, of multiple data flows, from the source device and destined for the destination device. The first data flow may have a first data flow type, of the multiple different types of data flows, and the second data flow may have a second data flow type of the multiple different types of data flows. The first data flow type may be different than the second data flow type. The network device may identify a first QoS to apply to the first data flow based on the first data flow type and based on one or more first parameters of the multiple parameters; and identify a second QoS to apply to the second data flow based on the second data flow type and based on one or more second parameters of the multiple parameters. The second QoS may be different than the first QoS. The network device may apply the first QoS to the first data flow to form a processed first data flow; apply the second QoS to the second data flow to form a processed second data flow; and transmit, via the network channel, the processed first data flow and the processed second data flow towards the destination device. The first data flow, the second data flow, the first processed data flow, or the second processed data flow may be received or transmitted via an optical layer.

According to another example implementation a computer-readable medium for storing instructions, may include multiple instructions which, when executed by one or more processors associated with an optical network device, cause the one or more processors to store multiple parameters identifying a respective QoS to apply to a corresponding multiple different types of data flows; facilitate establishment of an optical network channel between a source device and a destination device through an optical network; and receive first and second data flows, of multiple data flows, from the source device and destined for the destination device. The first data flow may have a first data flow type, of the multiple different types of data flows, and the second data flow may have a second data flow type of the multiple different types of data flows. The first data flow type may be different than the second data flow type. The multiple instructions may further cause the one or more processors to identify a first QoS to apply to the first data flow based on the first data flow type and based on the multiple parameters; and identify a second QoS to apply to the second data flow based on the second data flow type and based on the multiple parameters. The second QoS may be different than the first QoS. The multiple instructions may further cause the one or more processors to apply the first QoS to the first data flow to form a processed first data flow; apply the second QoS to the second data flow to form a processed second data flow; and transmit the processed first data flow and the processed second data flow towards the destination device via the optical network channel.

DETAILED DESCRIPTION

The following detailed description refers to the accompanying drawings. The same reference numbers in different drawings may identify the same or similar elements.

Systems and/or methods, as described herein, may provide different quality of service (QoS) treatments for multiple different types of data flows transmitted via a single network channel in an optical network and/or a computer network.

Figure 1A:
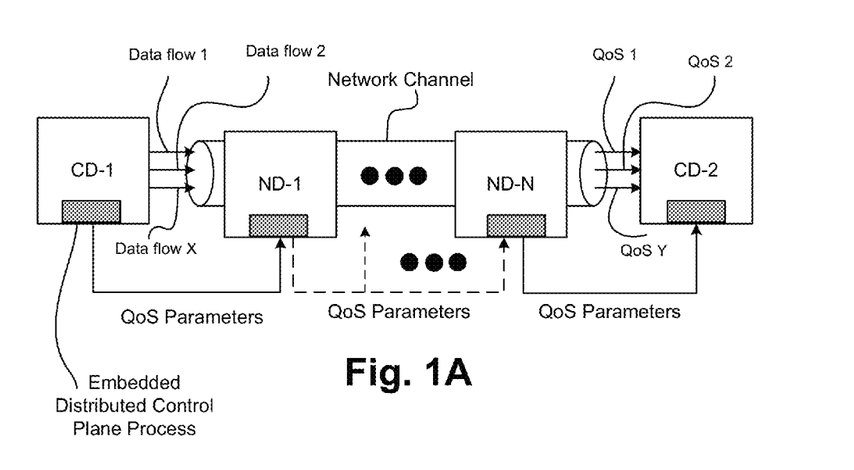
FIGS. 1A-1C illustrate example overview implementations described herein.
Figure 1B:
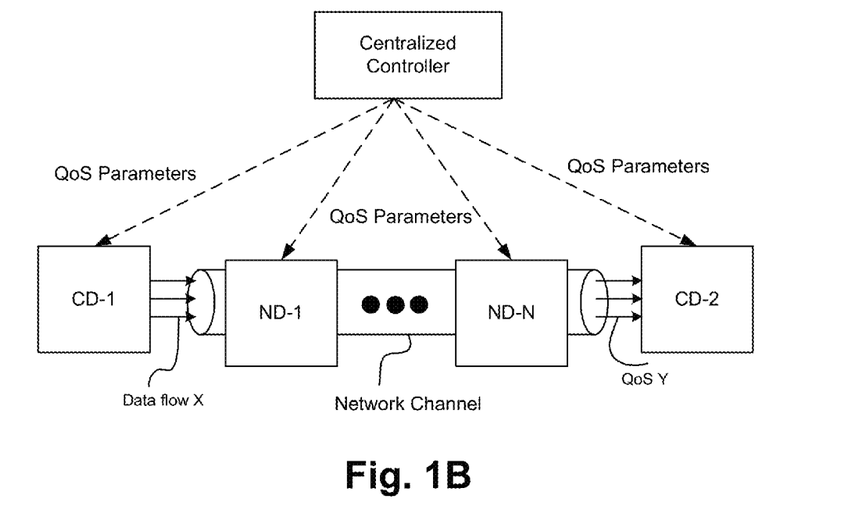
Figure 1C:
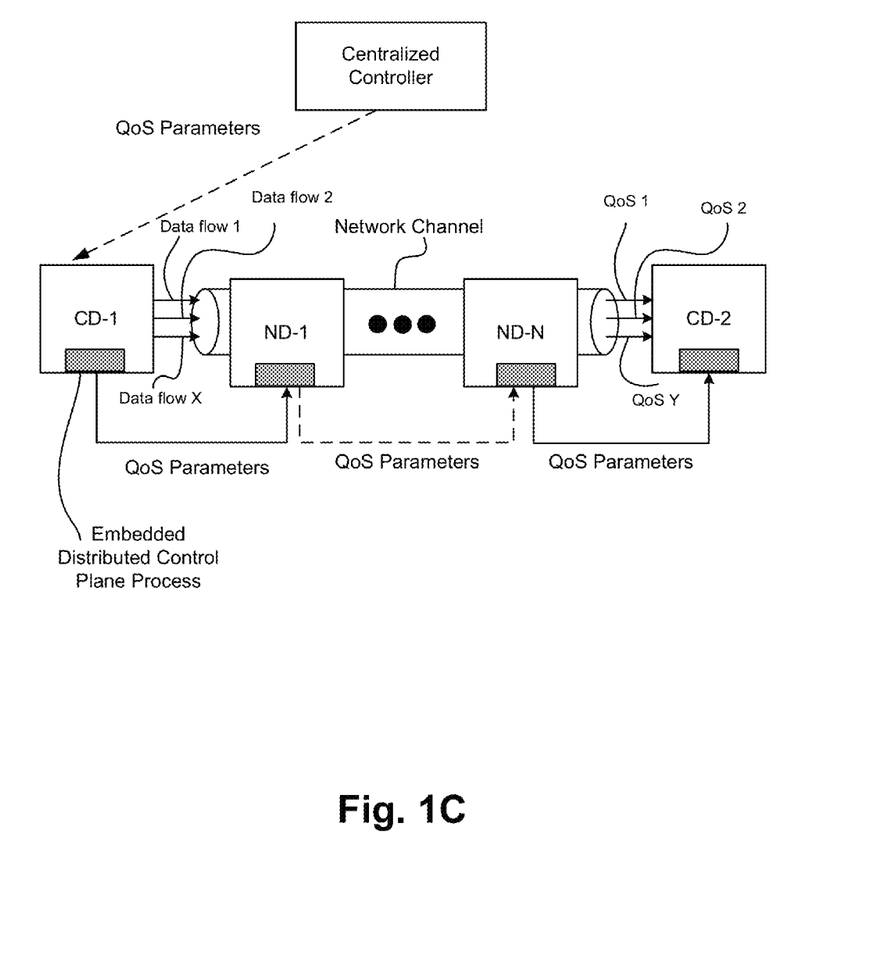

FIGS. 1A-1C illustrate example implementations as described herein. As shown in FIG. 1A, a client device (e.g., CD-1) may communicate with another client device (e.g., CD-2) via multiple network devices (e.g., ND-1 through ND-N where N>1) and via a network channel connecting CD-1, ND-1 through ND-N, and CD-2. In some implementations, multiple data flows (e.g., data flow 1 through data flow X, where X>1) may be transmitted via the network channel (e.g., a label-switch path (LSP) channel, an experimental LPS (E-LSP) channel, a label-only-inferred LSP (L-LSP) and/or some other type of network channel). In some implementations, the multiple data flows may each receive a different QoS treatment based on the type of data flow (e.g., a voice/audio type data flow, a video type data flow, etc.). For example, each of the multiple network devices may receive information identifying the QoS treatments to apply to the different types of data flows. In some implementations, respective types of the multiple data flows may be identified by header information in each of the multiple data flows.

In some implementations, the QoS treatments may be based on a service level agreement (SLA) between a user of a client device and a network provider associated with network devices ND-1 through ND-N and the network channel. For example, the user of the client device may purchase the network channel from the network provider and may specify QoS treatments (e.g., in the SLA) to apply to data flows (based on data flow type) transmitted via the network channel.

As further shown in FIG. 1A, CD-1 may store QoS parameters that identifies QoS treatments that ND-1 through ND-N may provide to individual data flows based on the types of the individual data flows (e.g., using an embedded distributed control plane process that identify signaling protocols to use to provide the QoS parameters). In some implementations, the QoS parameters may be signaled to ND-1 through ND-N via a hop-by-hop process (e.g., using a Resource Reservation Protocol—Traffic Engineering (RSVP-TE) protocol, a Diff-Server—Traffic Engineering (DS-TE) protocol or some other protocol). For example, as shown in FIG. 1A, CD-1 may provide the QoS parameters to ND-1. ND-1 may receive the QoS parameters and may provide the QoS parameters to ND-2. Similarly, ND-2 may provide the QoS parameters to ND-3, ND-3 may provide the QoS parameters to ND-4, and so on. As a result, individual data flows, sent and/or received by CD-1 and/or CD-2, may each receive a particular QoS treatment based on the type of data flow.

Additionally, or alternatively, ND-1 through ND-N may receive the QoS parameters from a centralized control (e.g., via a software defined networking (SDN) control protocol, or via some other technique). For example, referring to FIG. 1B, a centralized controller may receive the QoS parameters (e.g., from an operator of the centralized controller) and may provide the QoS parameters to ND-1 through ND-N to allow each of ND-1 through ND-N to provide a particular QoS treatment for each type of data flow. Additionally, or alternatively, ND-1 may receive the QoS parameters from a centralized controller and may provide the QoS parameters to ND-2. For example, referring to FIG. 1C, the centralized controller may provide the QoS parameters to ND-2, ND-2 may provide the QoS parameters to ND-3, ND-3 may provide the QoS parameters to ND-4, and so on.

As a result, individual data flows, sent and/or received by CD-1 and/or CD-2 via the network channel, may each receive a particular QoS treatment based on the type of data flow in a manner that fulfills an SLA between users of client devices and a network provider associated with the network channel.

Further, the network resources may be optimized by allocating network resources in a manner that allows multiple data flows to each receive a particular QoS treatment (e.g., to fulfill the SLA without exceeding requirements of the service level agreement and/or to improve statistical multiplexing gain and scalability).

As an example, assume that a particular SLA identifies that a first type of data flow is to receive a particular QoS treatment, such as a guaranteed bit rate (GBR) of 10 megabits per second (mbps). Further, assume that a second type of data flow is to receive another QoS treatment, such as a GBR of 15 mbps. Given these assumptions, the systems and/or methods may allocate network resources such that the first type of data flow receives a GBR of 10 mbps such that network resources may be made available to provide a GBR of 15 mbps to the second type of data flow (e.g., by reallocating network resources to service the first type of data flow to the second type of data flow).

Figure 2:
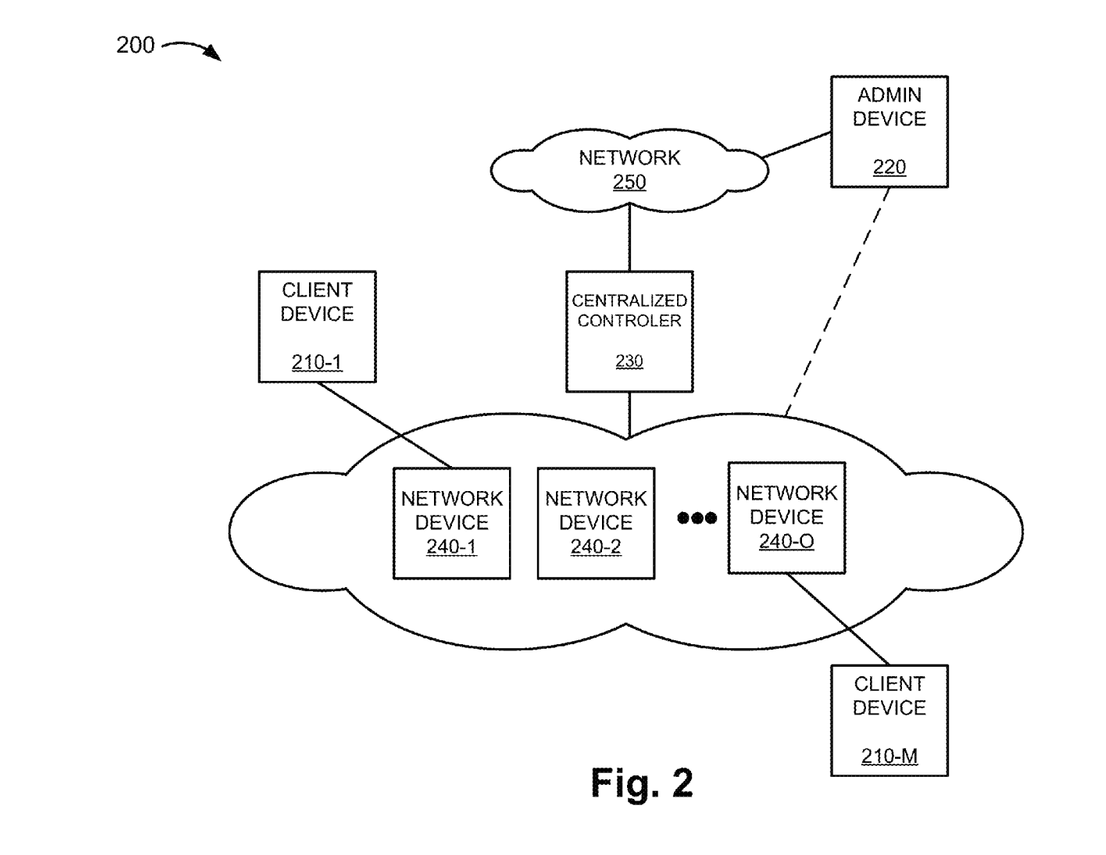
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, ..., 210-M (where M≥1) (referred to collectively as "client devices 210" and individually as "client device 210"), administrative device (referred to as "admin device") 220, centralized controller 230, network devices 240-1 through 240-O (where O≥1) (referred to collectively as "network devices 240" and individually as "network device 240"), and network 250.

Client device 210 may include any type of network device, such as a router, a switch, or a central office, that may transmit and/or receive data traffic. In some implementations, client device 210 may transmit a client signal (e.g., an optical transport network (OTN) signal, a synchronous optical network (SONET) signal, a synchronous digital hierarchy (SDH) signal, an Ethernet signal, or another type of signal) to network device 240. The client signal may conform to any payload type, such as the payload types identified above. In some implementations, client device 210 may include a distributed control plane process to signal QoS parameters to network device 240 (e.g., using an RSVP-TE signaling protocol and/or or some other signaling protocol).

Admin device 220 may include one or more computing devices, such as a server device, or a collection of server devices. In some implementations, admin device 220 may communicate with centralized controller 230 and/or network device 240 to provide information identifying QoS parameters for different types of data flows. For example, an operator of admin device 220 may provide the information identifying QoS parameters via a user interface of admin device 220. In some implementations, admin device 220 may communicate with centralized controller 230 and/or network device 240 using a set of login credentials.

Centralized controller 230 may include one or more computing devices, such as a server device or a collection of server devices. In some implementations, centralized controller 230 may store may store information identifying QoS parameters for different types of data flows. In some implementations, centralized controller 230 may receive the information identifying QoS parameters from an operator of centralized controller 230 via a user interface of centralized controller 230. Additionally, or alternatively, centralized controller 230 may receive the information identifying QoS parameters from admin device 220 and/or from some other source. In some implementations, and as described above, centralized controller 230 may provide the information identifying the QoS parameters to one or more network devices 240.

Network device 240 may include a digital switching device (e.g., an OTN device), a dense wavelength division multiplexing (DWDM) device, or a device that is a combination of a digital switching device and a DWDM device. In some implementations, network device 240 may perform digital or optical multiplexing operations (e.g., receive individual client signals on individual channels and generate a multiplexed signal, such as a multiplexed digital signal or a multi-wavelength optical signal, that may be transmitted on a single channel), amplification operations (e.g., amplify the multiplexed signal), add-drop multiplexing operations (e.g., remove one or more client signals from the multiplexed signal), and/or demultiplexing operations (e.g., receive the multiplexed signal and separate the multiplexed signal back into individual client signals that may be transmitted on individual channels). To perform these operations, network device 240 may contain various components, such as a multiplexer (to perform the multiplexing operations), an amplifier (to perform the amplification operations), an add-drop multiplexer (e.g., a remotely configurable add/drop multiplexer (ROADM)) (to perform the add-drop multiplexing operations), and/or a demultiplexer (to perform the demultiplexing operations).

In some implementations, network device 240 may receive a data flow destined for client device 210 and transmit the data flow towards client device 210. In some implementations, network device 240 may schedule data flows for transmission using a set of scheduling requirements and/or a scheduling algorithm.

Network devices 240 may be connected via optical links. Data traffic may flow from node-to-node over a series of channels/sub-channels forming a path. Any two network devices 240 may connect via multiple optical links. For bidirectional communication, for example, a first optical link may be used for data traffic transmitted in one direction, a second optical link may be used for data traffic transmitted in the opposite direction, and a third optical link may be used in case of a failure on the first link or the second link. A "working path" may refer to a set of channels/sub-channels associated with one or more first optical links (or second optical links) between two network devices 240. A "protection path" may refer to a set of channels/sub-channels associated with one or more third optical links between two network devices 240. In practice, there may be R working paths and S protection paths between two network devices 240, where S≤R.

A network device 240 that receives a client signal from a client device 210 will be referred to as an "ingress node." A network device 240 that transmits a client signal to a client device 210 will be referred to as an "egress node." Network devices 240 on the path between the ingress node and the egress node will be referred to as "intermediate nodes." A network device 240 may act as an ingress node with regard to one client signal and an intermediate or egress node with regard to another client signal. Thus, network devices 240 may form an arbitrary mesh network. In some implementations, network devices 240 may be connected via an optical network, such as an optical transport network (OTN), a DWDM optical layer, and/or a combination of these or other types of networks.

In some implementations, network device 240 may include a distributed control plane process to modify routing instructions to provide QoS treatments to data flows (e.g., based on receiving the QoS parameters). In some implementations, network device 240 may include a routing protocol (e.g., a open shortest path first (OSPF)-TE/DS-TE, an intermediate system to intermediate system (ISIS)-TE/DS-TE, a group management protocol (GMP) and/or some other routing protocol) to route data flows in accordance with the QoS parameters. Further, the distributed control plane process may identify a signaling protocol to provide the QoS parameters to other network devices 240.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, network 250 may include a local area network (LAN), a wide area network (WAN), a metropolitan network (MAN), a telephone network (e.g., the Public Switched Telephone Network (PSTN)), an ad hoc network, a managed IP network, a multiprotocol layer switching (MPLS) network, an IP/MPLS network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
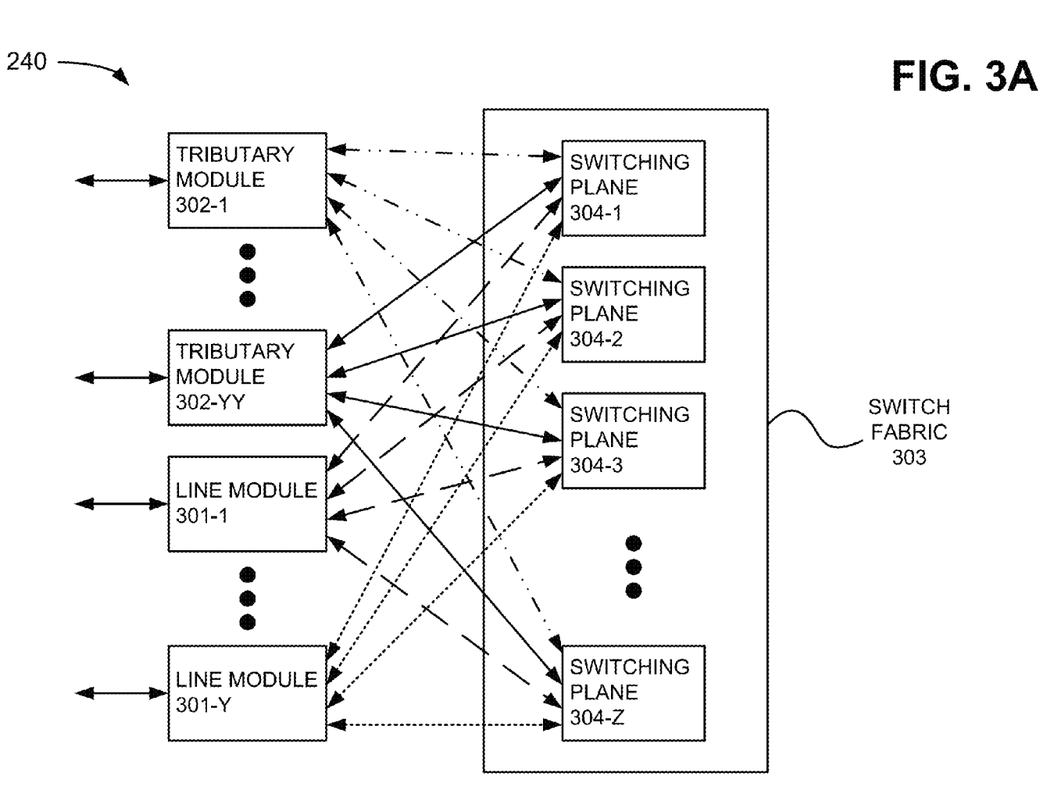
FIG. 3A illustrates example components of a network device that may be used within the environment of FIG. 2.

FIG. 3A is a diagram of example components of network device 240. As shown in FIG. 3A, network device 240 may include line modules 301-1, . . . , 301-Y (referred to collectively as "line modules 301," and generally as "line module 301") (where Y≥1) and tributary modules 302-1, . . . , 302-YY (referred to collectively as "tributary modules 302," and generally as "tributary module 302") (where YY≥1) connected to a switch fabric 303. As shown in FIG. 3A, switch fabric 303 may include switching planes 304-1, 304-2, . . . 304-Z (referred to collectively as "switching planes 304," and generally as "switching plane 304") (where Z≥1).

Line module 301 may include hardware components, or a combination of hardware and software components, that may provide network interface operations. Line module 301 may receive a multi-wavelength optical signal and/or transmit a multi-wavelength optical signal. A multi-wavelength optical signal may include a number of optical signals of different optical wavelengths. In some implementations, line module 301 may perform retiming, reshaping, regeneration, time division multiplexing, and/or recoding services for each optical wavelength. Line module 301, associated with an ingress node, may also multiplex multiple signals into a super signal for transmission to one or more other network devices 240.

Tributary module 302 may include hardware components, or a combination of hardware and software components, that may support flexible adding-dropping of multiple services, such as SONET/SDH services, gigabit Ethernet (Gbe) services, optical transport network (OTN) services, and/or fiber channel (FC) services. For example, tributary module 302 may include an optical interface device, such as a fiber optics module, a small-form pluggable (SFP) module, a tributary interface module (TIM), and/or some other type of optical interface device.

Switch fabric 303 may include hardware components, or a combination of hardware and software components, that provide switching functions to transfer data between line modules 301 and/or tributary modules 302. In some implementations, switch fabric 303 may provide fully non-blocking transfer of data. Each switching plane 304 may be programmed to transfer data from a particular input to a particular output.

As shown in FIG. 3A, each of line modules 301 and tributary modules 302 may connect to each of switching planes 304. The connections between line modules 301/tributary modules 302 and switching planes 304 may be bidirectional. While a single connection is shown between a particular line module 301/tributary module 302 and a particular switching plane 304, the connection may include a pair of unidirectional connections (i.e., one in each direction).

While FIG. 3A shows a particular quantity and arrangement of components, network device 240 may include additional components, fewer components, different components, or differently arranged components than those illustrated in FIG. 3A. Also, it may be possible for one of the components of network device 240 to perform a function that is described as being performed by another one of the components.

Figure 3B:
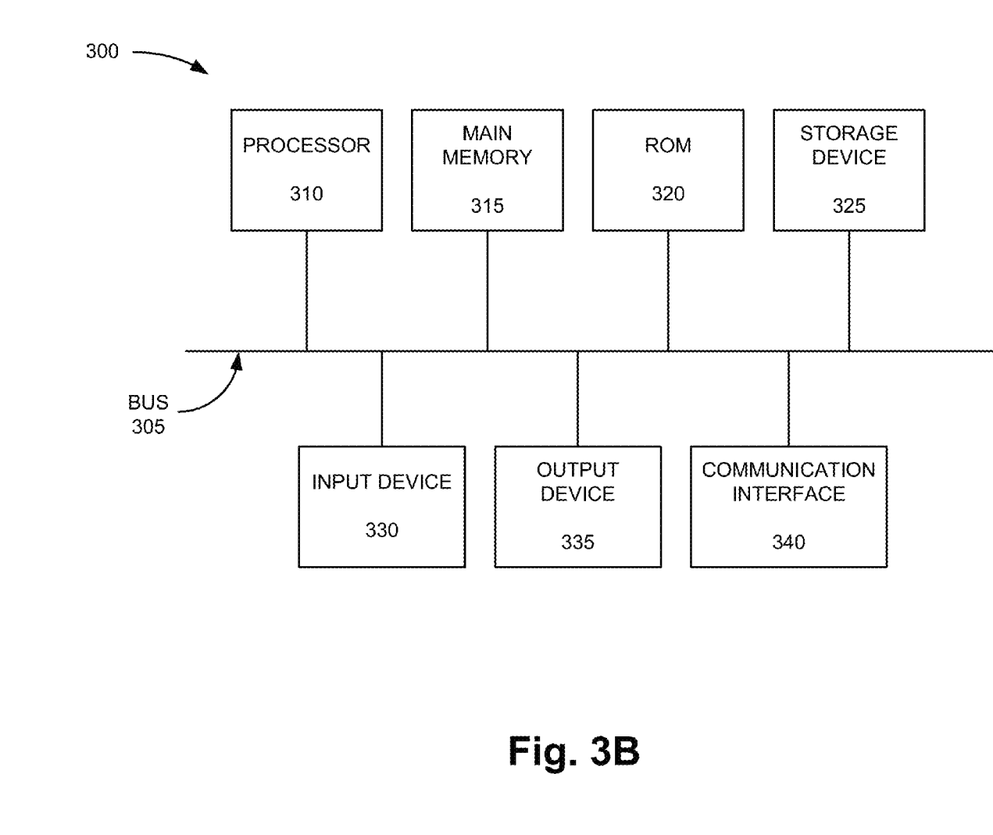
FIG. 3B illustrates example components of a device that may be used within the environment of FIG. 2.

FIG. 3B illustrates example components of a device 300 that may be used within environment 200 of FIG. 2. Device 300 may correspond to client device 210, admin device 220, and/or centralized controller 230. Each of client device 210, admin device 220, and/or centralized controller 230 may include one or more devices 300 and/or one or more components of device 300.

As shown in FIG. 3B, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components.

Figure 4:
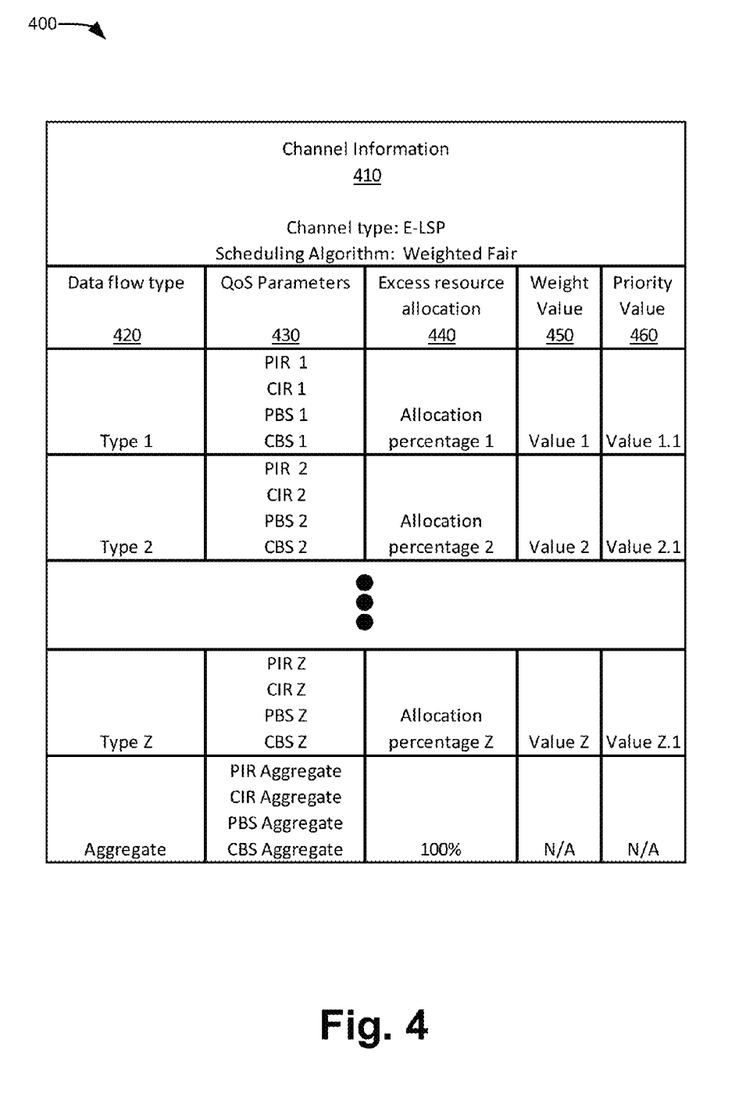
FIG. 4 illustrates an example data structure that may be stored by one or more devices in the environment of FIG. 2.

FIG. 4 illustrates an example data structure 400 that may be stored by one or more devices in environment 200. In some implementations, data structure 400 may be stored in a memory of network device 240. In some implementations, data structure 400 may be stored in a memory separate from, but accessible by, network device 240. In some implementations, data structure 400 may be stored by some other device in environment 200, such as client device 210, admin device 220, and/or centralized controller 230. A particular instance of data structure 400 may contain different information and/or fields than another instance of data structure 400.

In some implementations, one instance of data structure 400 may include information identifying QoS treatments that different types of data flows, transmitted via a network channel, may receive during transmission via the network channel. Another instance of data structure 400 may include information identifying QoS treatments that different types of data flows, associated with another network channel, may receive during transmission. In some implementations, information stored by data structure 400 may be received by admin device 220, centralized controller 230, and/or network device 240 using an RSVP-TE signaling protocol and/or some other type of protocol.

In some implementations, information stored by data structure 400 may be associated with an SLA between a user of client device 210 and a provider of the network channel (e.g., a provider associated with network devices 240). For example, the user of client device 210 may purchase the network channel (e.g., a VPN and/or an E-LSP network channel) from the provider of the network channel and may specify QoS treatments (e.g., in the SLA) to apply to data flows (by data flow type) transmitted via the network channel.

As shown in FIG. 400, data structure 400 may include channel information field 410, data flow type field 420, QoS parameters field 430, excess resource allocation field 440, weight value field 450, and priority value field 460.

Channel information field 410 may identify parameters associated with the particular channel of data structure 400. For example, channel information field 410 may identify the type of channel (e.g., an E-LSP channel, a VPN channel, and/or some other type of network channel), a scheduling algorithm for data flows associated with the channel, a user of the network channel (e.g., a user of client device 210), a provider of the network channel, and/or some other information relating to the channel (e.g., an identifier of the channel, identifiers of network devices 240 associated with the channel, etc.).

In some implementations, network device 240 may use the scheduling algorithm to queue and/or schedule a data flow, associated with the channel, such that each data flow in the channel receives a QoS treatment based on the type of the data flow. For example, channel information field 410 may identify a weighted fair queue scheduling algorithm, a fixed fair queue scheduling algorithm, a priority based scheduling algorithm, a minimum guarantee scheduling algorithm, a maximum guarantee scheduling algorithm, a customized scheduling algorithm, and/or some other type of scheduling algorithm. In some implementations, the scheduling algorithm may be changed at any time (e.g., to modify how data flows are scheduled for transmission).

In some implementations, channel information field 410 may include some additional information not shown in FIG. 4. For example, channel information field 410 may include information that identifies an owner or a subscriber of the network channel (e.g., a user of client device 210). Additionally, or alternatively, channel information field 410 may include some other information relating to the network channel.

Data flow type field 420 may include information to identify a type of data flow with which to apply a particular QoS treatment based on a corresponding set of QoS parameters. For example, data flow type field 420 may store a description of a particular type of data flow, such as "audio," "video," and/or some other description for another type of data flow. Additionally, or alternatively, data flow type field 420 may store an identifier, such as a string of characters (e.g., the characters "123"), that identify the type of a data flow. For example, the string of characters may correspond to the type of data flow. In some implementations, data flow type field 420 may include information that allows network device 240 to identify a type of the data flow, such as header information included in the data flow that identifies the type of data flow. In some implementations, data structure 400 may store QoS information for data flow type 1 through data flow type Z, where Z>1 (as shown by data flow type 1 through data flow type Z in data flow type field 420). In some implementations, data flow type field 420 may identify an aggregate of QoS values for all data flow types for the network channel associated with data structure 400 (e.g., as indicated by "aggregate" in data flow type field 420).

QoS parameters field 430 may include information that identifies a QoS treatment to apply to a corresponding type of data flow. For example, QoS parameters field 430 may identify a minimum or maximum peak information rate (PIR) value, a minimum or maximum committed information rate (CIR) value, a minimum or maximum peak burst size (PBS) value, a minimum or maximum committed burst size (CBS) value (e.g., a CBS value in a traffic spec (TSPEC) or FlowSpec associated with the network channel), a minimum or maximum guaranteed bit rate (GBR) value, a minimum or maximum latency value, a minimum or maximum jitter value, and/or some other parameter related to QoS treatment.

Additionally, QoS parameters field 430 may identify aggregate QoS values for the entire network channel of data structure 400. For example, QoS parameters field 430 may identify an aggregate PIR value, an aggregate CIR value, an aggregate PBS value, and/or an aggregate CBS for the entire network channel. Additionally, or alternatively, QoS parameters field 430 may identify an aggregate value for another type of QoS.

In some implementations, the aggregate values may be used in conjunction with a scheduling algorithm. For example, for a weighted-fair queue scheduling algorithm, the aggregate values may be used to determine bandwidth that may be allocated to particular data flow types. As an example, assume that data flow type 1 has a CIR value of 5 gigabits per second (gbps), data flow type 2 has a CIR value of 10 gbps, and the aggregate CIR of the network channel is 10 gbps. Given these assumptions, network device 240 may schedule data flows such that data flow type 1 may receive 3.33 gbps of bandwidth (e.g., using the formula CIR type 1 value/(CIR type 1 value+CIR type 2 value)*aggregate CIR value)=5/(10+5)*10=3.33) and data flow type 2 may receive 6.67 gbps of bandwidth (e.g., using the formula CIR type 2 value/(CIR type 1 value+CIR type 2 value)*aggregate CIR value)=10/(10+5)*10=6.67). In some implementations, the aggregate values may be used in conjunction with some other type of scheduling algorithm.

In some implementations (e.g., when a network channel is subject to a minimum or maximum guarantee based scheduling algorithm), network device 240 may schedule data flows such that data flows receive a minimum or maximum amount of bandwidth (e.g., based on information stored by QoS parameters field 430).

Excess resource allocation field 440 may include information to identify a percentage of excess resources, associated with the network channel of data structure 400, to allocate to a data flow of the network channel based on the type of the data flow. As an example, assume that the network channel includes 10 mbps of excess bandwidth (e.g., bandwidth that is unused after data flows of the network channel have received respective QoS treatments). Further, assume that data flow type 1 is to receive 20% of the excess resources. Given this assumption, network device 240 may cause a data flow of type 1 to receive an additional 2 mbps of bandwidth.

Weight value field 450 may include information identifying weighting factors that network device 240 may apply to each type of data flow such that higher weighted data flows receive a higher portion of available bandwidth associated with a network channel. In some implementations, information stored by weight value field 450 may be used to schedule data flows transmitted via a network channel subject to a fixed-fair scheduling algorithm. For example, the amount of bandwidth to provide to each data flow type may be expressed as: bandwidth for data flow=aggregate CIR value for network channel*(data flow weight value)/(total weight values for all data flow types associated with the network channel). As an example, assume that data flow type 1 has a weight value of 100 and that data flow type 2 has a weight value of 150. Further, assume that the aggregate CIR value of the network channel is 10 gbps. Given these assumptions, network device 240 may schedule data flows such that data flow type 1 may receive 4 gbps of bandwidth (e.g., 10*100/(100+150)=4) and data flow type 2 may receive 6 gbps of bandwidth (e.g., 10*150/(100+150)=6).

Priority value field 460 may include a priority value for each data flow type transmitted via the network channel of data structure 400. In some implementations, network device 240 may schedule data flows such that higher data flows having a higher priority are scheduled for transmission over data flows having a lower priority (e.g., such that the higher priority data flows receive a required amount of bandwidth). As an example, assume that data flow type 1 and data flow type 2 have CIR values of 5 gbps and 10 gbps, respectively. Further, assume that data flow type 1 has a priority value of P1 and data flow type 2 has a lower priority value than data flow type 1 (e.g., a priority value of P2). Further, assume that the network channel has an aggregate CIR value of 10 gbps. Given these assumptions, network device 240 may schedule data flows such that data flow type 1 receives 5 gbps of bandwidth and data flow type 2 receives the remaining 5 gbps of bandwidth. For example, because data flow type 1 has a higher priority than data flow type 2, network device 240 may schedule the data flows such that data flow type 1 receives the full CIR bandwidth and such that data flow type 2 receives any remaining bandwidth of the network channel (e.g., based on the aggregate CIR value) up to the CIR value of data flow type 2.

While particular fields are shown in a particular format in data structure 400, in practice, data structure 400 may include additional fields, fewer fields, different fields, or differently arranged fields than are shown in FIG. 4. Additionally, or alternatively, data structure 400 may include information identifying a maximum shaping rate limit for each data flow type.

While data structure 400 is described in terms of a particular network channel, in practice, data structure 400 may include information for multiple network channels. For example, data structure 400 may include aggregate QoS values for the multiple network channels (e.g., bandwidth capacity for the sum of the multiple network channels).

Figure 5:
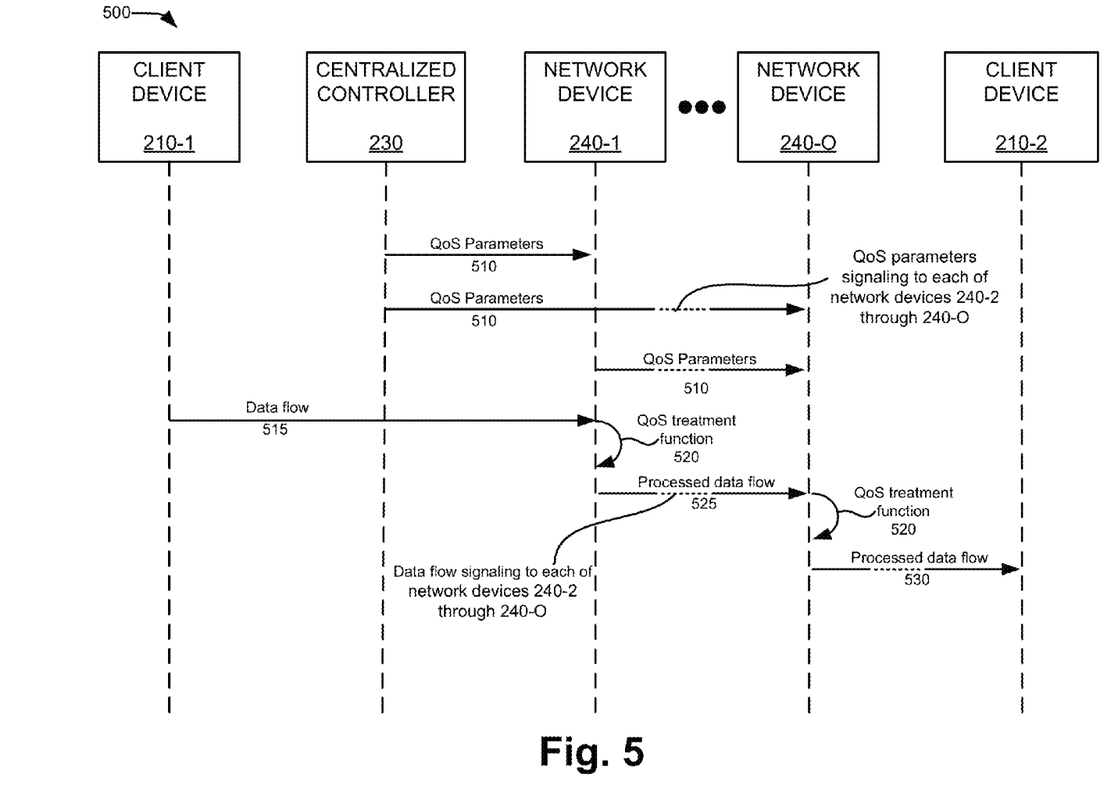
FIG. 5 illustrates a call flow diagram of example operations capable of being performed by an example portion of the environment of FIG. 2.

FIG. 5 illustrates a call flow diagram of example operations capable of being performed by an example portion 500 of environment 200. As shown in FIG. 5, portion 500 may include client device 210-1, client device 210-2, centralized controller 230, and network devices 240-1 through 240-O. In some implementations, client device 210-1, client device 210-2, centralized controller 230, and network devices 240-1 through 240-O may include components and/or perform functions described above in connection with, for example, one or more of FIGS. 1-3. FIG. 5 may correspond to example operations to provide QoS parameters to network devices 240-1 through 240-O to allow network devices 240-1 through 240-O to apply different QoS treatments to different types of data flows. In FIG. 5, assume that client device 210-1 and client device 210-2 communicate via network devices 240-1 through 240-O via a network channel connecting client device 210-1, network devices 240-1 through 240-O, and client device 210-2.

As shown in FIG. 5, centralized controller 230 may provide QoS parameters 510 to network device 240-1 (e.g., based on receiving QoS parameters 510 from an operator of centralized controller 230 and/or from admin device 220). In some implementations, QoS parameters 510 may correspond to information stored by data structure 400. As further shown in FIG. 5, centralized controller 230 may provide QoS parameters 510 to each of network devices 240-1 through 240-O. Alternatively, centralized controller 230 may not provide QoS parameters 510 to some or all of network devices 240-1 through 240-O. In some implementations, a signaling instruction (e.g., provided by an operator of centralized controller 230) may identify which of network devices 240-1 through 240-O may receive QoS parameters 510 from centralized controller 230. In some implementations, QoS parameters 510 may be provided to network device 240-1 through network device 240-O using an RSVP-TE signaling protocol and/or some other type of protocol.

As shown in FIG. 5, network device 240-1 may receive QoS parameters 510 from centralized controller 230. Additionally, or alternatively, network device 240-1 may receive QoS parameters 510 from admin device 220 (e.g., when QoS parameters 510 are not received from centralized controller 230 when the signaling protocol indicates that network device 240-1 is not to receive QoS parameters 510 from centralized controller 230). Additionally, or alternatively, network device 240-1 may receive QoS parameters 510 via an operator of network device 240-1 and/or via an embedded distributed control plane protocol. In some implementations, network device 240-1 may provide QoS parameters 510 to network device 240-2 (e.g., using a hop-by-hop signaling protocol when centralized controller 230 does not provide QoS parameters to network device 240-2 through network device 240-O). Network device 240-2 may provide QoS parameters 510 to network device 240-3, network device 240-3 may provide QoS parameters 510 to network device 240-4, and so on.

In some implementations, client device 210-1 may provide data flow 515 to network device 240-1. For example, data flow 515 may include a communication destined for client device 210-2. In some implementations, network device 240-1 may perform QoS treatment function 520 to apply a particular QoS treatment to data flow 515 based on QoS parameters 510. In some implementations, network device 240-1 may determine a type, associated with data flow 515, and may identify a QoS treatment to apply to data flow 515 based on the type of data flow 515. For example, network device 240-1 may determine the type of data flow based on a header of one or more data packets included in data flow 515. In some implementations, network device 240-1 may classify data flow 515 and may add a label (e.g., an MPLS label) in the header of data flow 515 to identify the type of data flow 515 (e.g., to allow subsequent network devices 240 in a path of data flow 515 identify the type of data flow 515). In some implementations, network device 240-1 may measure data flow 515 (e.g., to identify a bit rate at which data flow 515 is received), mark data flow 515 based on the measured information of data flow 515 and the type, drop packets from data flow 515 based on the measured information and the data flow type, queue data flow 515, and/or schedule data flow 515 based on the queue and/or based on a scheduling algorithm, such as a weighted fair queuing algorithm, a strict priority algorithm, or some other type of scheduling algorithm.

As an example, assume that network device 240-1 receives data flow 515 and identifies that data flow 515 is an audio stream type data flow. Further, assume that QoS parameters 510 include information to identify that audio stream type data flows are to receive a particular QoS treatment (e.g., the lesser of a GBR of 2 mbps or the bit rate at which the data flow is received). Further, assume that network device 240-1 measures data flow 515 (e.g., to identify a bit rate at which data flow 515 is received) and identifies that data flow 515 is received at a bit rate of 4 mbps. Given these assumptions, network device 240-1 may drop packets from data flow 515 (e.g., since data flow 515 is received at a higher bit rate than the GBR requirement) and/or mark data flow 515 to identify a measure of network resources (e.g., a measure of bandwidth) to provide to data flow 515 in order to apply the QoS treatment to data flow 515. Additionally, or alternatively, network device 240-1 may add data flow 515 in a queue and may schedule data flow 515 such that data flow 515 may receive the QoS treatment and such that other data flows in the queue receive a particular QoS treatment based on the types of the other data flows. For example, network device 240-1 may schedule data flow 515 to be transmitted ahead of, or after, other data flows such that each data flow receives a particular QoS treatment. Additionally, or alternatively, network device 240-1 may allocate excess bandwidth to data flow 515 based on information stored by data structure 400. Some examples of queuing data flows and scheduling data flows are described above with respect to data structure 400.

In some implementations, network device 240-1 may form processed data flow 525 based on performing QoS treatment function 520. As a result, processed data flow 525 may include data flow 515 having an applied QoS treatment based on QoS parameters 510 and based on the type of data flow 515.

In some implementations, network device 240-1 may provide processed data flow 525 to client device 210-2 via network devices 240-2 through 240-O. For example, each of network devices 240-2 through 240-O may perform QoS treatment function 520 in a similar manner as performed by network device 240-1 to form processed data flow 530 and provide processed data flow 530 to client device 210-2. In some implementations, processed data flow 530 may include data flow 515 having an applied QoS treatment based on QoS parameters 510.

As an example, assume that network device 240-1 provides processed data flow 525 to network device 240-2, as described above. Network device 240-2 may perform QoS treatment function 520 to identify a type of data flow 525, measure data flow 525, mark data flow 525 based on the measured information of data flow 525, drop packets from data flow 525 based on the measured information, queue data flow 525, and/or schedule data flow based 525 on the queue and/or based on a scheduling algorithm. Network device 240-2 may form processed data flow 525-1 (e.g., a data flow corresponding to data flow 515 with an applied QoS treatment) based on performing QoS treatment function 520. Network device 240-2 may provide processed data flow 525-1 to network device 240-3. Network device 240-3 may perform QoS treatment function 515 to form processed data flow 525-2 and provide processed data flow 525-2 to network device 240-4, and so on. Network device 240-O may perform QoS treatment function 515 to form processed data flow 530 corresponding to data flow 515 having an applied QoS treatment.

Thus, data flow 515, provided by client device 210-1 and destined for client device 210-2, may receive a QoS treatment based on the type of data flow, (e.g., when network devices 240-1 through 240-O form data flow 530, as described above). Further, multiple data flows 515 in the same network channel may each receive a particular QoS treatment based on the type of each of the multiple data flows 515. For example, each of the multiple data flows 515 may be individually measured, individually marked, individually queued with other data flows 515, and individually scheduled for transmission with other data flows 515 such that each data flow 515 receives a particular QoS treatment based on the type of the data flow 515. Additionally, or alternatively, excess bandwidth may be shared between multiple data flows 515 based on information stored by data structure 400.

In some implementations, data flow 515, processed data flow 525, and/or processed data flow 530 may be transmitted via a packet network layer (e.g., an IP/MPLS layer), via a digital network layer (e.g., an OTN digital layer), via an optical network layer (e.g., a DWDM optical layer), and/or via some other network layer. For example, data flows may be converted into a digital format (e.g., using a transceiver photonic integrated circuit (PIC)) for transmission over the digital layer, converted to an optical format for transmission over the optical layer. In some implementations, the data flow may be transmitted to a destination device via ROADM type network devices 240 that may provide switching and/or routing services when the data flow is in the optical format. In some implementations, the data flow may be converted from an optical or digital format to a packet format such that network devices 240-1 through 240-O may apply a particular QoS treatment to the data flow.

While a particular series of operations and/or data flows have been described above with regards to FIG. 5, the order of the operations and/or data flows may be modified in other implementations. Further, non-dependent operations may be performed in parallel.

Figure 6A:
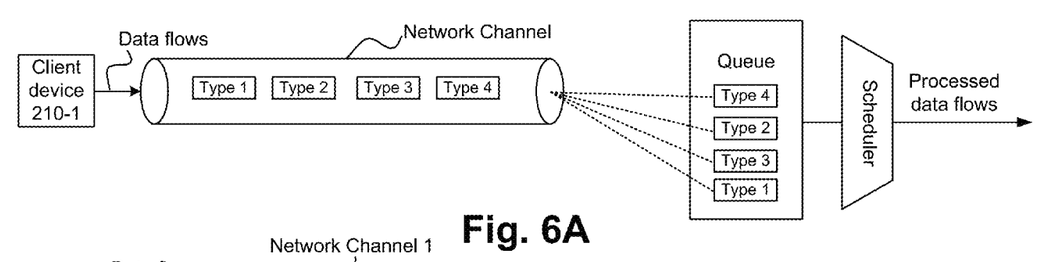
FIGS. 6A-6C illustrate example implementations as described herein.
Figure 6B:
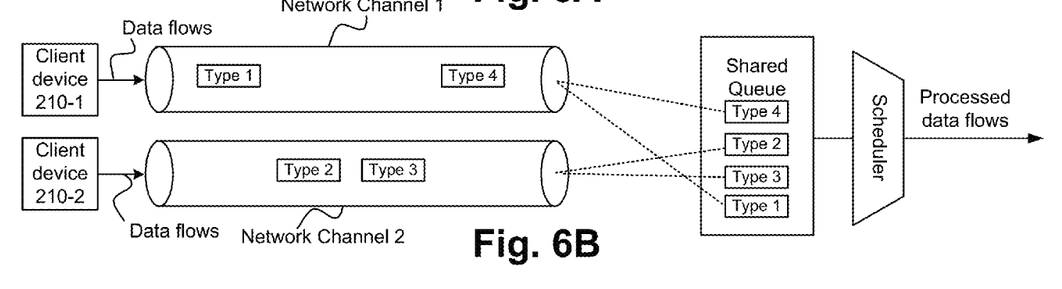
Figure 6C:
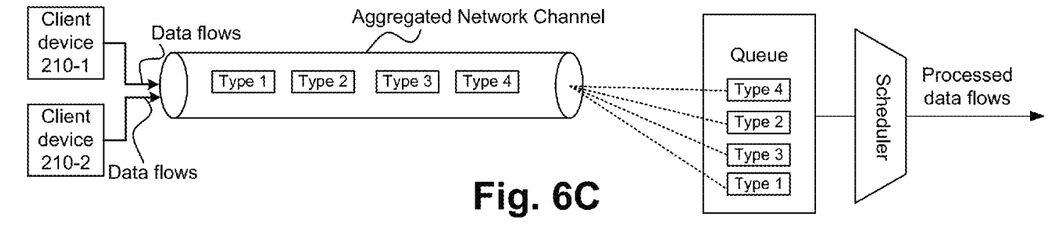

FIGS. 6A-6C illustrate example implementations as described herein. In some implementations, FIGS. 6A-6C may correspond to scheduling and/or queuing functions performed by network device 240. In FIG. 6A, assume that client device 210-1 is associated with a single network channel to transmit data flows. As shown in FIG. 6A, client device 210-1 may provide a number of different types of data flows via a network channel (e.g., data flow type 1, data flow type 2, data flow type 3, data flow type 4, etc.). As described above, network device 240 may form a queue of the data flows based on the QoS parameters of each data flow, based on measured information associated with the data flows (e.g., information that identifies a bit rate in which the data flows are received), and/or based on some other information. In some implementations, network device 240 may schedule the data flows, based on the queue and based on a scheduling algorithm, to form processed data flows to be transmitted to a destination device (e.g., via multiple intermediate network devices 240).

In some implementations, network device 240 may schedule data flows transmitted via multiple network channels and from multiple client devices. For example, referring to FIG. 6B, a first network channel (e.g., network channel 1) may transmit data flows from client device 210-1 (e.g., data flow type 1 and data flow type 4). As further shown in FIG. 6B, a second network channel (e.g., network channel 2) may transmit data flows from client device 210-2 (e.g., data flow type 2, and data flow type 3). In some implementations, network device 240 may form a single queue (e.g., a shared queue) for transmission of the data flows received via multiple network channels and from multiple client devices 210. In FIG. 6B, assume that client device 210-1 and client device 210-2 are associated with different parties. Thus, network device 240 may form a shared queue associated with client devices 210 of different parties (e.g., for more efficient queuing and QoS treatment of data flows).

In some implementations, network device 240 may schedule data flows transmitted via an aggregated network channel (e.g., a single network channel that is shared by multiple client devices 210). For example, as shown in FIG. 6C, client device 210-1 and client device 210-2 may provide data flows via an aggregated network channel. In some implementations, network device 240 may form a queue for data flows transmitted via an aggregated network channel. For example, network device 240 may form the queue based on QoS parameters for each data flow type and/or based on SLAs associated with client device 210-1 and client device 210-2. Further, network device 240 may schedule the data flows to form processed data flows, as described above.

As a result, network device 240 may queue and schedule the data flows such that each data flow receives a particular QoS treatment based on the type of the data flow. Further, each data flow may receive a particular QoS treatment when scheduling algorithms and/or protocols differ between multiple network devices 240 used to transmit the data flows.

While particular examples are shown in FIGS. 6A-6C, it will be apparent that the above description is merely an example implementation. For example, client device 210-1 and client device 210-2 may provide any number of data flows having different types.

As described above, individual data flows, sent and/or received by client devices 210, may each receive a particular QoS treatment based on the type of data flow in a manner that fulfills an SLA between client devices 210 and a network provider associated with a network channel. Further, network resources may be optimized by allocating the network resources in a manner that allows multiple data flows to each receive a particular QoS treatment (e.g., to fulfill the SLA without exceeding requirements of the service level agreement). Further, data flows may be transmitted via a digital layer and/or an optical layer for improved bandwidth capacity and network flexibility. Further, a reduction in the label-switched path (LSP), associated with a network channel, may be achieved as a result of providing QoS parameters in a hop-by-hop manner or via centralized controller 230.

The foregoing description provides illustration and description, but is not intended to be exhaustive or to limit the possible implementations to the precise form disclosed.

Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    storing, by a network device, a plurality of parameters identifying a respective quality of service (QoS) to apply to a corresponding plurality of different types of data flows, the parameters including: a minimum peak information rate (PIR) value, a minimum committed information rate (CIR) value, a maximum peak burst size (PBS) value, a minimum committed burst size (CBS) value, a minimum guaranteed bit rate (GBR) value, a maximum latency value, a maximum jitter value;
    initiating, by the network device, establishment of a network channel between a source device and a destination device through an optical network, said initiating including sending a message from the source device to the destination device, the message complying with an RSVP-TE protocol and including the parameters;
    receiving, by the network device, first and second data flows, of a plurality of data flows, from the source device and destined for the destination device,
        the first data flow having a first data flow type of the plurality of different types of data flows,
    the second data flow having a second data flow type of the plurality of different types of data flows,
    the first data flow type being different from the second data flow type;
    identifying, by the network device, a first QoS to apply to the first data flow based on the first data flow type and based on the plurality of parameters;
    identifying, by network device, a second QoS to apply to the second data flow based on the second data flow type and based on the plurality of parameters,
        the second QoS being different than the first QoS;
    applying, by network device, the first QoS to the first data flow to form a processed first data flow;
    applying, by network device, the second QoS to the second data flow to form a processed second data flow; and
    transmitting, by the network device and via the network channel, the processed first data flow and the processed second data flow towards the destination device.

2. The method of claim 1, where the network device is a first network device,
    the method further comprising:
        receiving, by the first network device, the plurality of parameters;
        where storing the plurality of parameters is based on receiving the plurality of parameters by the first network device;
        providing, by the first network device, the plurality of parameters to a second network device based on storing the plurality of parameters,
            the plurality of parameters being usable by the second network device to apply the first QoS to the first data flow or the second QoS to the second data flow.

3. The method of claim 1, where the network channel is a label-switched path (LSP) network channel.

4. The method of claim 1, further comprising:
    receiving the plurality of parameters from a server device;
    where storing the plurality of parameters is based on receiving the plurality of network parameters.

5. The method of claim 1, where the first data flow, the second data flow, the first processed data flow, or the second processed data flow are received or transmitted via an optical layer of the optical network.

6. The method of claim 1, where the plurality of parameters are based on a service level agreement (SLA) between a user, associated with the source device, and a provider, associated with the network device.

7. The method of claim 1, where the network device is an optical device.

8. The method of claim 1, further comprising:
    determining that the first data flow is using an amount of bandwidth that is less than an amount of bandwidth allocated to the first data flow,
        an excess bandwidth being a difference between the amount of bandwidth allocated to the first data flow and the amount of bandwidth used by the first data flow; and
    allocating the excess bandwidth to the second data flow.

9. A system comprising:
    one or more network devices configured to:
        store a plurality of parameters identifying a respective quality of service (QoS) to apply to a corresponding plurality of different types of data flows, the parameters including: a minimum peak information rate (PIR) value, a minimum committed information rate (CIR) value, a maximum peak burst size (PBS) value, a minimum committed burst size (CBS) value, a minimum guaranteed bit rate (GBR) value, a maximum latency value, a maximum jitter value;
        establishing a network channel between a source device and a destination device through an optical network, said establishing including sending a message from the source device to the destination device, the message complying with an RSVP-TE protocol and including the parameters;
        receive first and second data flows, of a plurality of data flows, from the source device and destined for the destination device,
            the first data flow having a first data flow type of the plurality of different types of data flows, the second data flow having a second data flow type of the plurality of different types of data flows, the first data flow type being different from the second data flow type;

identify a first QoS to apply to the first data flow based on the first data flow type and based on one or more first parameters of the plurality of parameters;

identify a second QoS to apply to the second data flow based on the second data flow type and based on one or more second parameters of the plurality of parameters, the second QoS being different than the first QoS;

apply the first QoS to the first data flow to form a processed first data flow;

apply the second QoS to the second data flow to form a processed second data flow; and transmit, via the network channel, the processed first data flow and the processed second data flow towards the destination device.

10. The system of claim 9, where the network channel is a label-switched path (LSP) network channel.

11. The system of claim 9, where the one or more network devices are further configured to:

receive the plurality of parameters from a server device;

where when storing the plurality of parameters, the one or more network devices are configured to store the plurality of parameters based on receiving the plurality of network parameters.

12. The system of claim 9, where the one or more network devices are one or more optical devices.

13. The system of claim 9, where the one or more network devices are further configured to:

determine that the first data flow is using an amount of bandwidth that is less than an amount of bandwidth allocated to the first data flow, an excess bandwidth being a difference between the amount of bandwidth allocated to the first data flow and the amount of bandwidth used by the first data flow; and allocate the excess bandwidth to the second data flow.

14. A computer-readable medium for storing instructions, the instructions comprising:

a plurality of instructions which, when executed by one or more processors associated with an optical network device, cause the one or more processors to:

store a plurality of parameters identifying a respective quality of service (QoS) to apply to a corresponding plurality of different types of data flows, the parameters including: a minimum peak information rate (PIR) value, a minimum committed information rate (CIR) value, a maximum peak burst size (PBS) value, a minimum committed burst size (CBS) value, a minimum guaranteed bit rate (GBR) value, a maximum latency value, a maximum jitter value;

establishing an optical network channel between a source device and a destination device through an optical network, said establishing including sending a message from the source device to the destination device, the message complying with an RSVP-TE protocol and including the parameters;

receive first and second data flows, of a plurality of data flows, from the source device and destined for the destination device, the first data flow having a first data flow type of the plurality of different types of data flows, the second data flow having a second data flow type of the plurality of different types of data flows, the first data flow type being different from the second data flow type;

identify a first QoS to apply to the first data flow based on the first data flow type and based on the plurality of parameters;

identify a second QoS to apply to the second data flow based on the second data flow type and based on the plurality of parameters, the second QoS being different than the first QoS;

apply the first QoS to the first data flow to form a processed first data flow;

apply the second QoS to the second data flow to form a processed second data flow; and transmit the first processed data flow and the second processed data flow towards the destination device via the optical network channel.

15. The computer-readable medium of claim 14, where the plurality of instructions further cause the one or more processors to:

receive the plurality of parameters from a server device;

where one or more instructions, of the plurality of instructions, to store the plurality of parameters, further cause the one or more processors to store the plurality of parameters based on receiving the plurality of network parameters.

16. The computer-readable medium of claim 14, where the optical network channel is a label-switched path (LSP) network channel.

17. The computer-readable medium of claim 14, where the plurality of instructions further cause the one or more processors to:

determine that the first data flow is using an amount of bandwidth that is less than an amount of bandwidth allocated to the first data flow, an excess bandwidth being a difference between the amount of bandwidth allocated to the first data flow and the amount of bandwidth used by the first data flow; and allocate the excess bandwidth to the second data flow.

* * * * *